(12) United States Patent
Tovey

(10) Patent No.: US 6,675,181 B1
(45) Date of Patent: Jan. 6, 2004

(54) METHOD AND APPARATUS FOR DETERMINING A BYTE SELECT VECTOR FOR A CROSSBAR SHIFTER

(75) Inventor: DeForest Tovey, Los Gatos, CA (US)

(73) Assignee: ATI International, SRL (BB)

( * ) Notice: Subject to any disclaimer, the term of this patent is extended or adjusted under 35 U.S.C. 154(b) by 0 days.

(21) Appl. No.: 09/471,878

(22) Filed: Dec. 23, 1999

(51) Int. Cl.[7] .................................................. G06F 7/00
(52) U.S. Cl. .................................................... 708/209
(58) Field of Search ............................ 708/209; 377/64

(56) References Cited

U.S. PATENT DOCUMENTS

| | | | | | |
|---|---|---|---|---|---|
| 4,051,358 A | * | 9/1977 | Schwartz | ..................... | 708/232 |
| 5,379,240 A | * | 1/1995 | Byrne | ......................... | 708/209 |
| 5,477,543 A | * | 12/1995 | Purcell | ....................... | 370/537 |
| 5,671,166 A | * | 9/1997 | Omote | ....................... | 708/209 |
| 5,896,305 A | * | 4/1999 | Bosshart et al. | ........... | 708/209 |

* cited by examiner

Primary Examiner—Chuong Dinh Ngo
(74) Attorney, Agent, or Firm—Vedder, Price, Kaufmann & Kammholz, P.C.

(57) ABSTRACT

A method and apparatus for determining a byte select vector for a crossbar shifter include processing that begins by storing data in a first set of byte locations and in a second set of byte locations. Typically, a data operand is written into the first and a shift value is written into the second set of byte locations. The processing continues by obtaining a shift amount value for the data. The processing then continues by determining, for each byte multiplexor of a set of byte multiplexors associated with a corresponding output byte, whether a wrapped condition will occur based on the shift amount for the data. When the wrap condition occurs, a wrap shift amount is determined based on a mode of shifting. The processing then continues by generating a byte select vector for the set of byte multiplexors based on the wrap shift amount and the shift amount. The byte select vector includes a first nibble that is associated with a first one of the byte multiplexors and a second nipple that is associated with a second one of the byte multiplexors.

14 Claims, 5 Drawing Sheets

METHOD AND APPARATUS FOR DETERMINING A BYTE SELECT VECTOR FOR A CROSSBAR SHIFTER

TECHNICAL FIELD OF THE INVENTION

This invention relates generally to processors and more particularly to an arithmetic shifter contained within such processors and enablement thereof.

BACKGROUND OF THE INVENTION

Computers are known to include a central processing unit (CPU), system memory, video graphics processing circuitry, audio processing circuitry, modems, and input/output (I/O) ports. The I/O ports allow the central processing unit to interface with peripheral devices such as monitors, keyboards, mouses, printers, the Internet, a local area network, etc. The central processing unit processes applications, which are stored in system memory, in accordance with user inputs to achieve a desired result.

To process the applications, the central processing unit includes circuitry to receive and decode instructions and circuitry to process data in accordance with the decoded instructions. The circuitry to process the data typically includes an arithmetic logic unit (ALU). The arithmetic logic unit performs arithmetic functions such as add, subtract, multiple, divide, shift data, etc. and performs logic functions such as AND, OR, AND, NOR, exclusive OR, etc.

To achieve the data shift function, the arithmetic logic unit includes an arithmetic shifter. One such arithmetic shifter is disclosed in U.S. Pat. No. 5,477,543. The 543 patent teaches a shifter that simultaneously and independently shifts and records a plurality of data bytes. Such a shifter includes first and second registers that each receive a plurality of data bytes. The first register is coupled to a plurality of first buses, with each of the first buses receiving a data byte from the first register. Similarly, the second register is coupled to a plurality of second buses, with each of the second buses receiving a data byte from the second register. A multiplicity of third buses is coupled to the first and second buses. A byte shifting multiplexor is coupled to each of the third buses. A plurality of bit shifting multiplexors are coupled to the byte shifting multiplexors, with each bit shifting multiplexor being coupled to a set of byte shifting multiplexors. A control circuit is coupled to the byte shifting and bit shifting multiplexors. The control circuit provides for independent control of each of the byte shifting multiplexors and each of the bit shifting multiplexors.

The shifter of the 543 patent efficiently produces shifted values, but could be enhanced to provide further functionality by at least preprocessing data before it is received by the shifter. To assist in the preprocessing of data, a byte select vector should be generated.

DETAILED DESCRIPTION OF A PREFERRED EMBODIMENT

Generally, the present invention provides a method and apparatus for determining a byte select vector for a crossbar shifter. Such a method and apparatus include processing that begins by storing data in a first set of byte locations and in a second set of byte locations. Typically, a data operand is written into the first and a shift value is written into the second set of byte locations. The processing continues by obtaining a shift amount value for the data. The processing then continues by determining, for each byte multiplexor of a set of byte multiplexors associated with a corresponding output byte, whether a wrapped condition will occur based on the shift amount for the data. Typically, a wrap condition will occur when the shift amount exceeds a byte, or multiple bytes, in length. When the wrap condition occurs, a wrap shift amount is determined based on a mode of shifting. The mode of shifting may be a logical shift where the shift data is zeros, an arithmetic shift where the shift data is the sign bit of the data operand or a rotating shift where the shift data is the data operand. The processing then continues by generating a byte select vector for the set of byte multiplexors based on the wrap shift amount and the shift amount. The byte select vector includes a first nibble that is associated with a first one of the byte multiplexors and a second nipple that is associated with a second one of the byte multiplexors. With such a method and apparatus, a byte select vector can be readily determined for a cross bar shifter to achieve further enhancements of an arithmetic logic unit.

Figure 1:
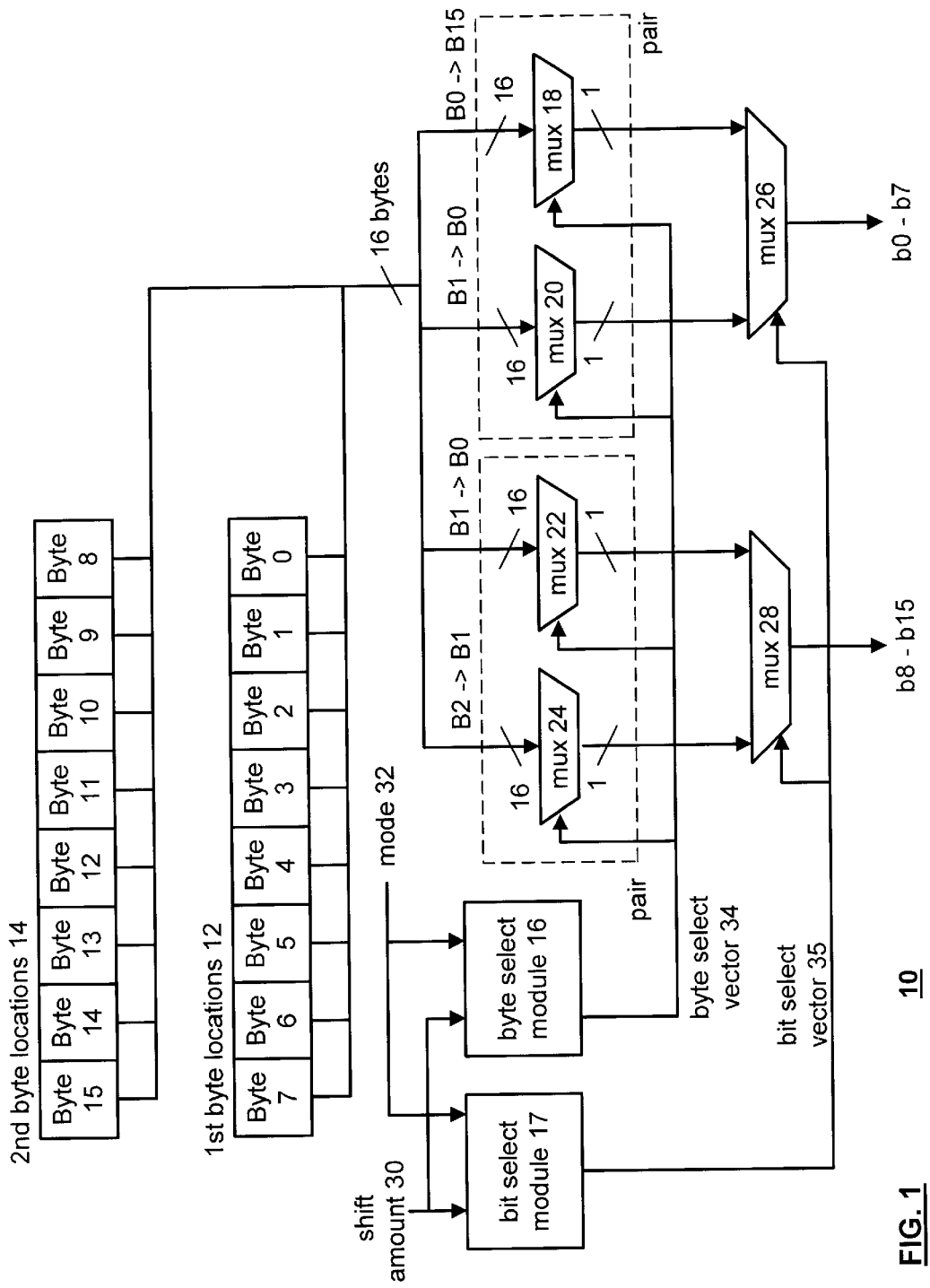
FIG. 1 illustrates a schematic block diagram of a portion of a crossbar shifter in accordance with the present invention.

The present invention can be more fully described with reference to FIGS. 1 through 8. FIG. 1 illustrates a portion of a crossbar shifter 10 that includes a first plurality of byte locations 12, a second plurality of byte locations 14, a byte select module 16, a bit select module 17, a plurality of byte multiplexors 18–24 and bit multiplexors 26 and 28. The first and second plurality of byte locations 12 and 14 are shown to include 8 bytes. For the purposes of this invention, a byte may be the conventional usage of the term to refer to 8 bits of data or may include more or less than 8 bits. Thus for the purposes of this discussion, a byte may refer to less than 8 bits (e.g., 4 bits) or more than 8 bits (e.g., 16 bits).

The byte shifter 10 would include 16 byte multiplexors to process the first and second plurality of byte locations when each of the byte locations 12 and 14 have 8 bytes. The byte multiplexors 18 through 24 will be arranged depending on the particular shift function being performed. As shown, the multiplexors are arranged in sets of two. This corresponds to processing two bytes of information per two sets of byte multiplexors. The two sets of byte multiplexors feed to two-bit multiplexors 26 and 28 to produce output bits b0 through b7 and b8 through b15. As one of average skill in the art would appreciate, if the shifting function were utilizing four bytes of information, the set of byte multiplexors would include two sets of four multiplexors feeding four bit multiplexors.

For illustrative purposes, FIG. 1 is shown for processing two byte shift functions. The first and second sets of byte multiplexors 18 and 20 and 22 and 24 are operating on the first and second byte of the first plurality of byte locations 12 and the byte positions 8 and 9 of the second plurality of byte locations 14. As configured, multiplexor 18 has its inputs organized from B0 through B15. With this organization, if the byte select vector 34 is 0, multiplexor 18 outputs byte B0, if the byte select 34 is one, multiplexor 18 outputs byte B1, etc. Multiplexor 20 has its inputs arranged from B1 through B0. When the corresponding byte select vector 34 is 0 for multiplexor 20, multiplexor 20 outputs B1. When the byte select vector 34 is one, multiplexor 20 outputs B2, when the vector 34 is 14, multiplexor 20 outputs B15 and when the vector 34 is 15, multiplexor 20 outputs B0. Multiplexor 22 also has its inputs arranged from B1 through B0, such that based on the corresponding byte select vector 34, the multiplexor 22 will output the corresponding byte. Multiplexor 24 has its inputs arranged from B2 through B1.

The byte select module 16 receives a shift amount 30 and a mode of shift 32 and produces therefrom a byte select vector 34. The byte select vector 34 includes individual byte values for each of the byte multiplexors 18 through 24. The details of the byte select module will be discussed in greater detail with reference to FIGS. 5 and 6.

The outputs of multiplexors 18 and 20 are provided to bit multiplexor 26. The outputs of multiplexor 22 and 24 are outputted to bit multiplexor 28. Based on a bit select vector 35 produced by the bit select module 17, multiplexors 26 and 28 produce the corresponding outputs for b0–b7 and b8–b15 of a output value.

Figure 2:
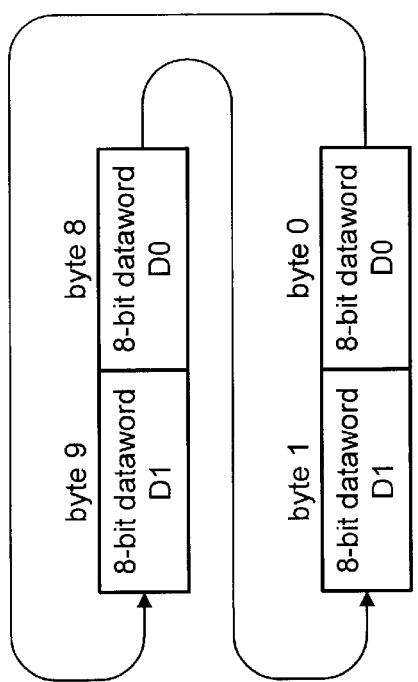
FIG. 2 illustrates a graphical representation of a 16-bit wrapping shift function in accordance with the present invention.

FIG. 2 illustrates a graphical representation of a 16-bit rotating shift function. In this embodiment, the data operand to be shifted includes two 8-bit data words D0 and D1. The data words D0 and D1 are written into bytes B0 and B1 of the first plurality of byte locations 12 and also written into bytes 8 and 9 of the second plurality of byte locations. Depending on the shift amount, the data will be rotated between these byte locations as indicated by the arrows. For example, if the shift amount is one bit, the least significant bit of D0 stored in byte 0 will be shifted to the most significant bit position of byte 9 and all other bits will be shifted one position to the right. Once the shift amount exceeds 8 bits, a wrap condition occurs. For the purposes of this discussion, a wrap condition occurs when data from byte 9 will be shifted into byte 1 for the final resultant.

Figure 3:
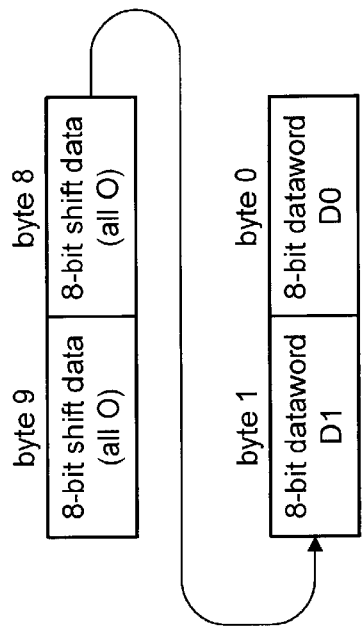
FIG. 3 illustrates a graphical representation of a 16-bit logical shift in accordance with the present invention.

FIG. 3 illustrates a graphical diagram of a logical shift function. In this illustration for a 16 bit logical shift, bytes 0 and 1 are filled with data words D0 and D1 of the data operand. Byte locations 8 and 9 are filled with data words of the shift data that include all zeros. As such, when a shift occurs, the most significant bits of byte 1 are filled with zeros.

Figure 4:
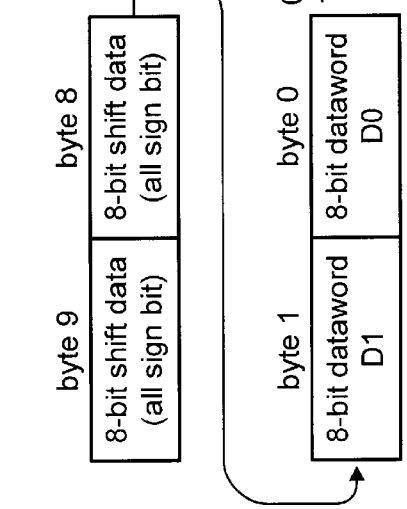
FIG. 4 illustrates a graphical representation of a 16-bit arithmetic shift in accordance with the present invention.

FIG. 4 illustrates a graphical representation of a 2-byte arithmetic shift. In this illustration, byte 0 and 1 are filled with data words D0 and D1 of the data operand. Byte 8 and 9 are filled with the data words of the shift data that equals the signed bit of the of the data operand. Accordingly, as the data is shifted into byte 0 and 1, the signed bit is shifted into the MSBs of byte 1. As one of average skill in the art would appreciate, the illustrative principles of FIGS. 2 through 4 may be equally applicable for a single byte shift function, 4 byte shift functions, 8 byte shift functions, etc.

Figure 5:
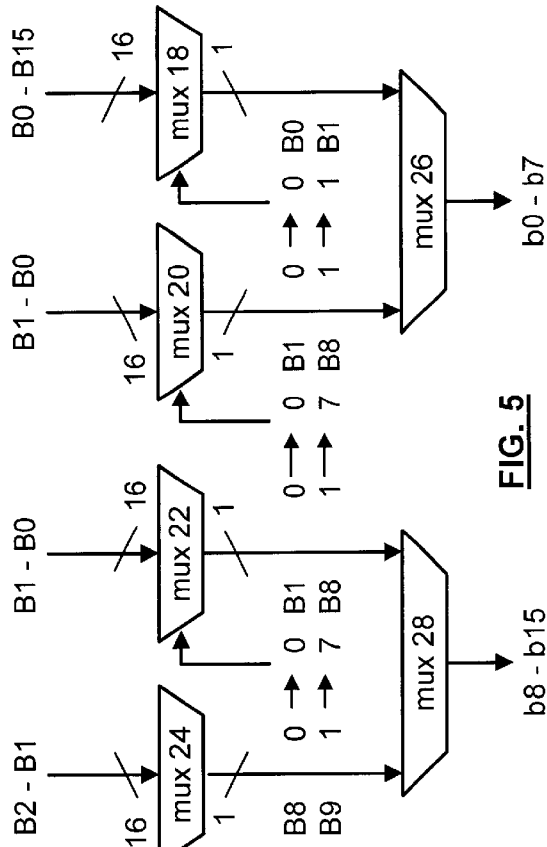
FIG. 5 illustrates a schematic block diagram of multiplexors that receive an appropriate byte select vector to achieve the shifting functions as shown in FIGS. 2 through 4.

FIG. 5 illustrates a schematic block diagram of the set of byte multiplexors providing output bytes to the corresponding bit multiplexors 26 and 28. In this illustration, the byte select vector for each byte multiplexor 18 through 24 is shown to be either a 0 or a 1, which is converted into a corresponding byte select signal. Note that this illustration is presented with the assumption that the shift function corresponds to a 2-byte shift function.

As shown, when the byte select vector is 0, multiplexor 18 outputs B0, multiplexor 20 outputs B1, multiplexor 22 outputs B1 and multiplexor 24 outputs B8. In this example, only multiplexor 24 has a wrap condition, where, for a 2-byte data operand, the byte select vector is offset by a wrap value of 6. As such, multiplexor 26 selects bits b0 through b7 from byte B0 and B1. Multiplexor 28 selects bits 8 through 15 of the output-shifted value from byte B1 and B8. Depending on the bit shift amount, multiplexors 26 and 28 will output the corresponding value. Note that when the bit shift amount is equal to or less than 7 bits, the byte select vector will be set for 0.

When the byte select vector is 1, multiplexor 18 outputs B1, multiplexor 20 outputs B8, multiplexor 22 outputs B8 and multiplexor 24 outputs B9. Note that the output of multiplexors 20–24 are the next byte location plus 6 (i.e., the wrap shift amount), where the next byte locations correspond to the multiplexor output when the byte selector is 1 without the addition of the wrap shift amount. This occurs to provide the wraparound function as illustrated in FIGS. 2 through 4. Further note that multiplexor 18 outputs the next consecutive byte location. Further note that if the shifting function were for a single byte, the offset value for outputting the bytes from multiplexor 20 and 24 would be 7 and if the data elements were 4 bytes the offset for multiplexors 20 and 24 would be 4. Still further note that the bit pattern for bits b0–b7 and b8–b15 will be based on a bit select vector that is provided to multiplexors 26 and 28. The bit select vector will be generated by the bit select module 17 at the same time the bit select module 16 generates the byte select vector, wherein the bit select vector corresponds the bit shift amount in a given byte of data. For example, for a shift amount 30 of 2, a byte select vector of 0 and a bit select vector of 2 would be generated. If the shift amount 30 is 10, a byte select vector of 1 and a bit select vector of 2 would be generated.

Figure 6:
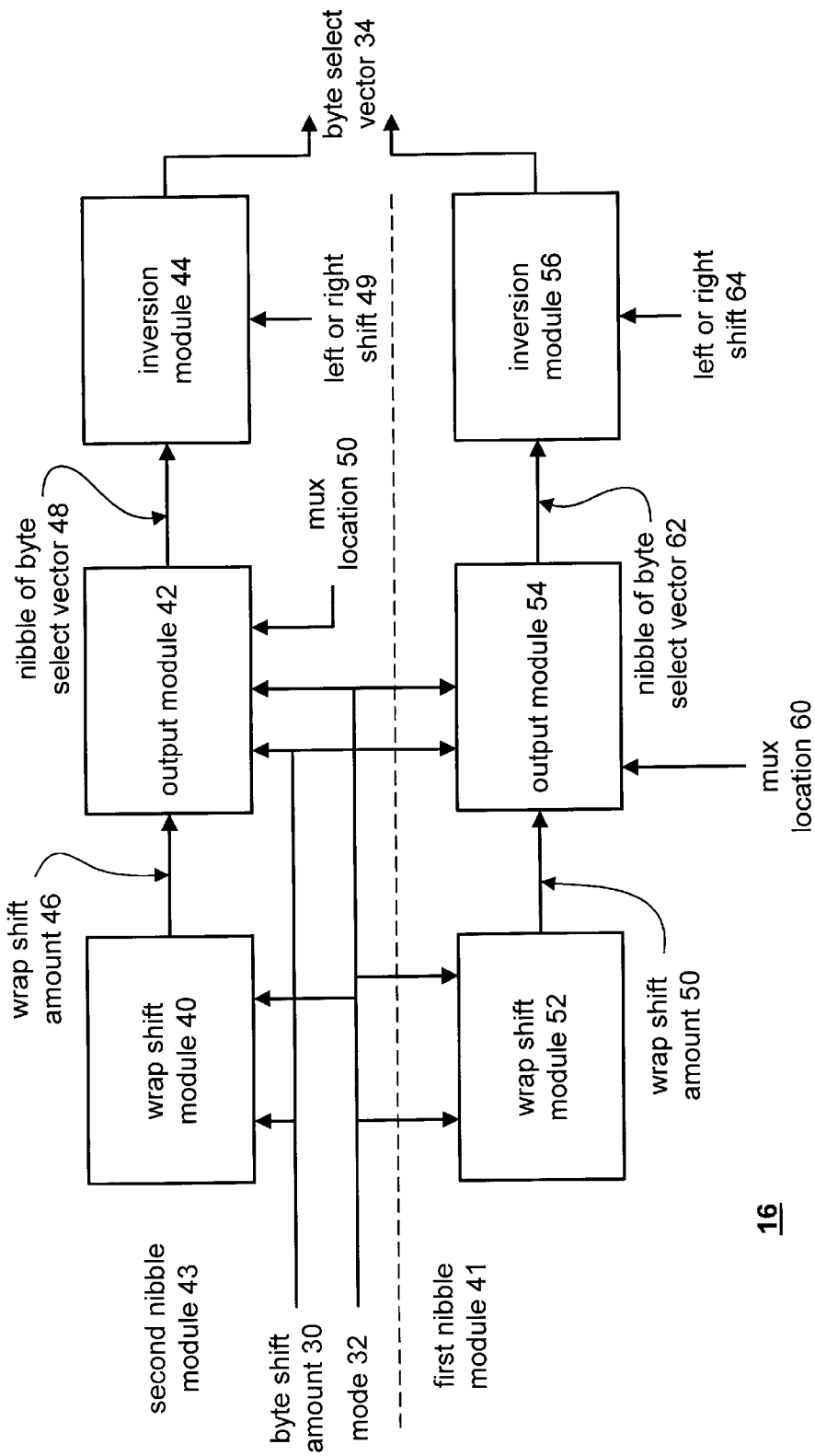
FIG. 6 illustrates a schematic block diagram of the byte select module of FIG. 1 in accordance with the present invention.

FIG. 6 illustrates a schematic block diagram of the byte select module 16. The byte select module, for each set of multiplexors includes a first nibble module 41 and a second nibble module 43. Each of the nibble modules 41 and 43 includes a wrap shift module 52 and 40, an output module 54 and 42, and an inversion module 56 and 44. Each nibble module functions in an identical fashion as such only one will be described in detail.

The wrap shift module 40 is operably coupled to receive a byte shift amount 30 and a mode of shifting 32. The mode of shifting may be a rotate shift function, a logical shift function and/or an arithmetic shift function for an end-bit data element. The byte shift amount 30 includes a byte shift portion and a bit shift portion. Based on these values, the wrap shift module 40 determines whether a wrap condition will occur, i.e., will data from the second byte location of the shift data wrap around to be in the first position of the output data (see FIGS. 2 through 4). If a wrap condition occurs, a wrap shift amount 46 will be generated. A wrap shift amount will depend on the particular size of the data operand. If the data operand is a 2-byte operand, the wrap shift amount 46 will be 6, if the data operand is 1 byte, the wrap shift amount will be 7, and if the data operand is 4 bytes, the wrap shift amount will be 4.

The output module 42 is operably coupled to receive the wrap shift amount 46, the byte shift amount 30, the mode of shifting 32 and the multiplexor location 50. Based on these values, the output module 42 generates a nibble of byte select vector 48. The corresponding nibble of byte select vector 48 would be the particular value provided to the multiplexor. This was illustrated with and discussed with respect to FIG. 5.

The inversion module 44 is operably coupled to receive the nibble of byte select vector 48 and to receive a left or right shift indication 49. If a right shift is indicated, the inversion module 44 passes the nibble of byte select vector 48 without processing. If, however, the left shift function is indicated, the inversion module 44 inverts the nibble of byte select vector 48. As one of average skill in the art would appreciate, a left-shift function may be implemented as a right-shift function wherein the shift amount is subtracted in a modulo fashion from the data operand size. For example, a shift-left of 2 bit function for a 16 bit word corresponds to a 14 bit shift right function.

Figure 7:
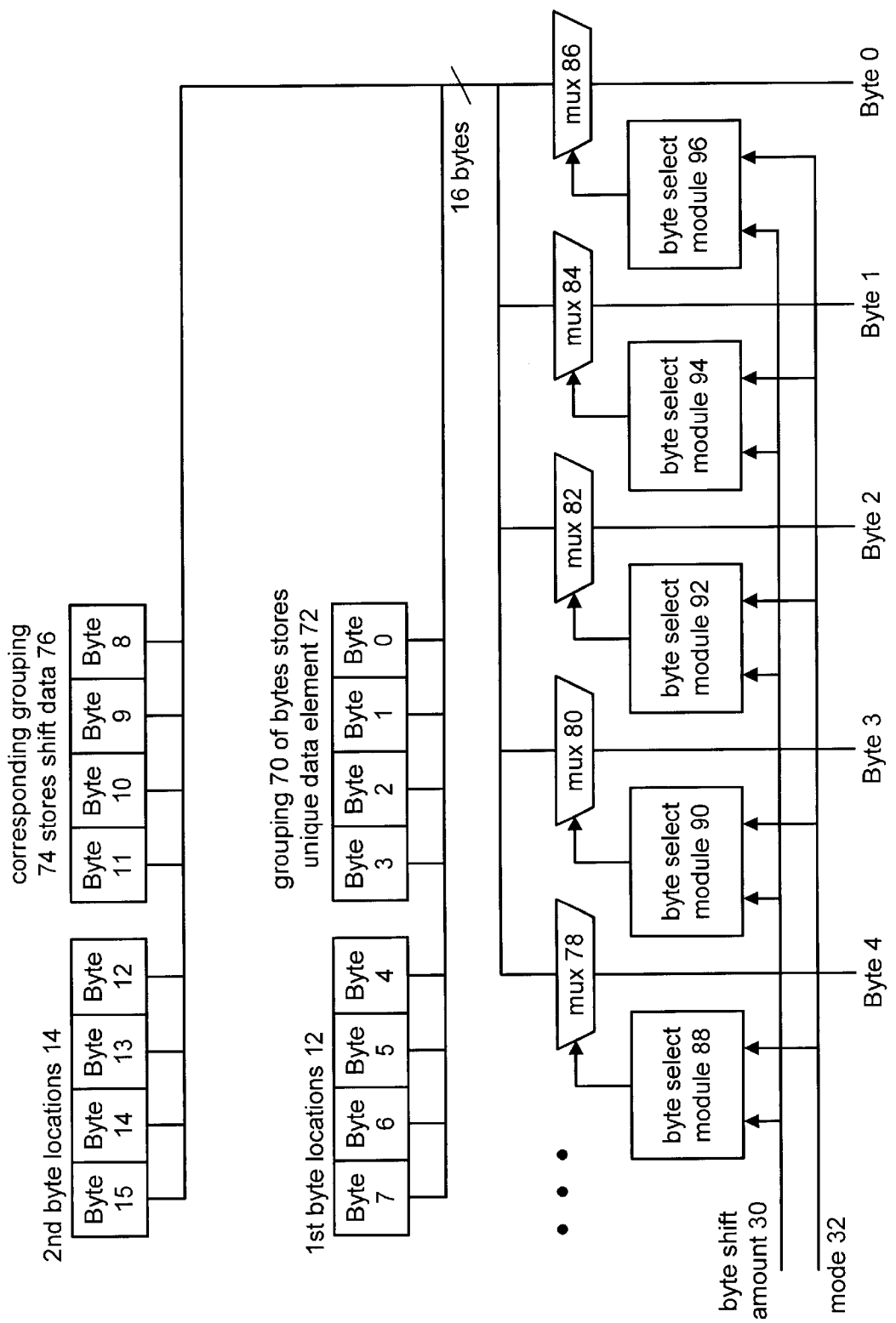
FIG. 7 illustrates a schematic block diagram of an alternate crossbar shifter in accordance with the present invention.

FIG. 7 illustrates a schematic block diagram of an alternate embodiment of the crossbar shifter. In this illustration, the bytes of the first and second plurality of locations are grouped based on the size of the data elements to be processed. As shown, the first byte locations 12 are divided into two groups of 4 bytes. The grouping 70 of bytes stores a unique data element 72 (i.e., data operand). The second plurality of byte locations 14 is also divided into groups where each grouping has a corresponding grouping within the first set. As shown, the corresponding group 74 would store shift data 76, which corresponds to the unique data element 72. As previously discussed, for a rotating shift function, the shift data 76 would be the unique data element 72. For an arithmetic shift, the shift data 76 would correspond to the sign bit of the unique data element 72 and for a logical shift, the shift data 76 would include all 0s.

The 16 bytes of the first and second plurality of byte locations are provided to each of a plurality of byte multiplexors 78 through 86. Each byte multiplexor 78 through 86 outputs a corresponding byte based on the inputs provided by the corresponding byte select module 88 through 96. The byte select modules 88 through 96 include circuitry as shown in a nibble module of FIG. 6. The remaining functionality of FIG. 7 corresponds to the functionality previously described with reference to FIGS. 1 through 6.

Figure 8:
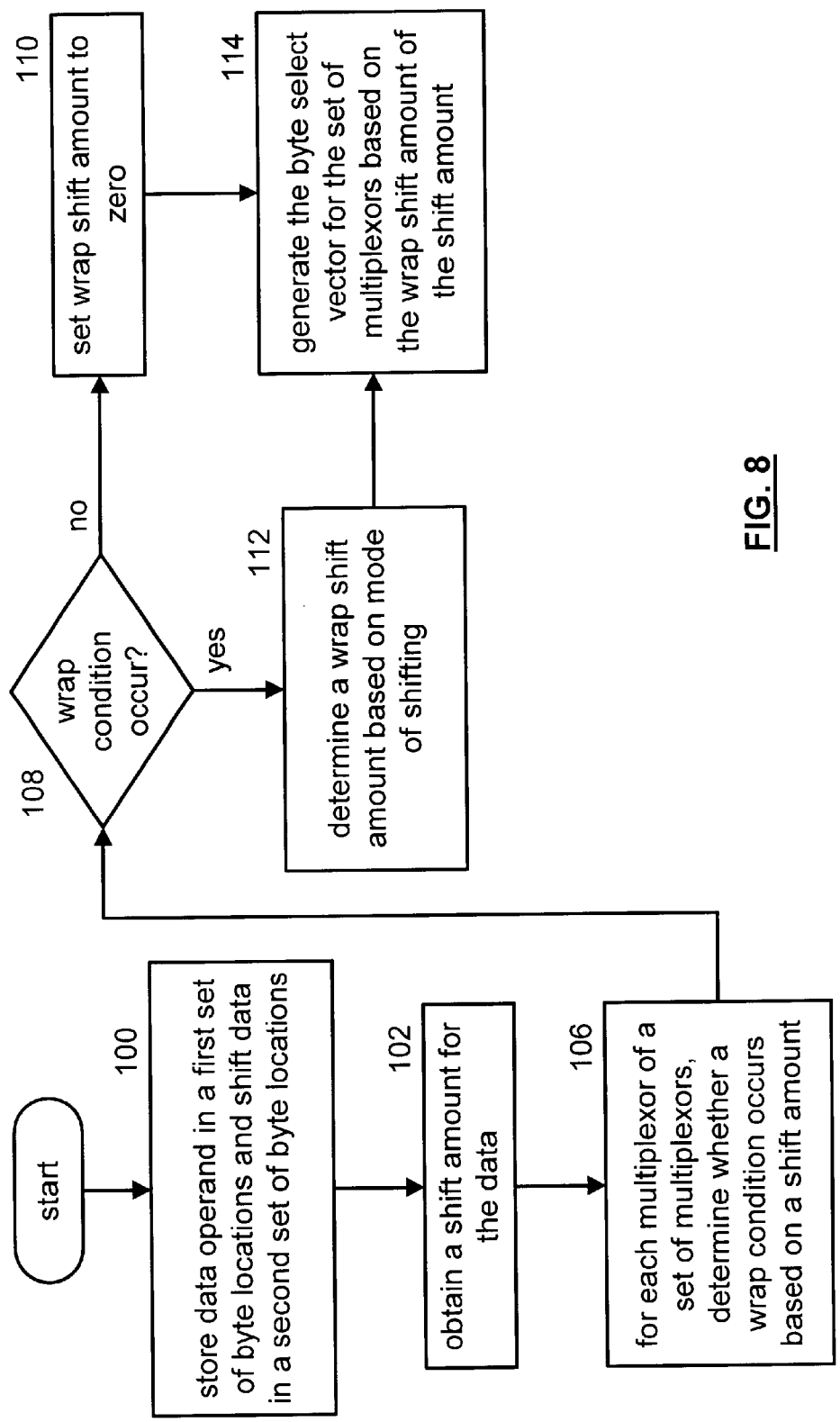
FIG. 8 illustrates a logic diagram of a method for determining a byte select vector in accordance with the present invention.

FIG. 8 illustrates a logic diagram of a method for determining a byte select vector. The processing steps of FIG. 8 may be implemented as programming instructions and executed by a processing module. The processing module may be a single processing device or a plurality of processing devices. Such a processing device may be a microprocessor, microcomputer, digital signal processor, microcontroller, central processing unit, state machine and/or logic circuitry. The processing steps may be stored in a memory, which may be a single memory device or a plurality of memory devices. Such a memory device may be system memory, RAM, ROM, etc. Note that when the processing module implements one or more of the steps via a state machine, the memory storing the corresponding instructions would be implemented within the circuitry comprising the state machine and/or logic circuit.

The process begins at step 100 where a data operand is stored in a first set of byte locations and shift data in a second of byte locations. The shift data stored in the second set of byte locations depends on the particular function being performed. This was discussed with reference to FIGS. 2 through 4. The number of byte locations comprising the first and second set depends on the data operand size. For a 16-bit data operand, two byte locations in the first and second set would be required.

The process then proceeds to step 102 where a shift amount for the data is obtained. The shift amount includes a byte shift value and a bit shift value. The process then proceeds to step 106 where a determination is made for each byte multiplexor of a set of byte multiplexors whether a wrap condition will occur based on the shift amount. The process then proceeds to step 108 where the outcome of whether a wrap condition will occur is processed. If a wrap condition does not occur, the process proceeds to step 110 where the wrap shift amount is set to zero. Having done this, the process proceeds to step 114 where the byte select vector is generated for the set of byte multiplexors based on the wrap shift amount and the shift amount.

If, however, a wrap condition will occur, the process proceeds to step 112. At step 112 a wrap shift amount is determined based on the mode of shifting. As previously discussed, if the data operand is a 16 bit word, the wrap shift amount will be plus 6. The wrap shift amount will be plus 7 if the data operand is a 8 bit word, and would be 4 for a 32-bit data operand. Having done this, the process proceeds to step 114 where the byte select vector is determined.

The processing steps of 100 through 114 are equally applicable for each set of byte locations in the first and second plurality of byte locations. As such, in the illustrations provided, if the data operand were 16 bits, four shift operations could be processed simultaneously. For each of the simultaneous 16 bit shift operations, the processing steps of 100 through 114 would be executed.

The preceding discussion has presented a method and apparatus for determining a byte shift vector for a crossbar shifter. By determining the byte shift vector in such a fashion, a crossbar shifter has enhanced performance. As one of average skill in the art would readily appreciate, other embodiments may be derived from the present teachings without deviating from the scope of the claims.

What is claimed is:

1. A method for determining a byte select vector for a cross-bar shifter, the method comprises the steps of:
    a) storing data operand in a first set of byte locations and shift data in a second set of byte locations;
    b) obtaining a shift amount for the data;
    c) determining, for each byte multiplexor of a set of byte multiplexors associated with a corresponding output byte, whether a wrap condition will occur based on the shift amount for the data;
    d) when the wrap condition will occur for at least one of the set of byte multiplexors, determining a wrap shift amount based on mode of shifting; and
    e) generating the byte select vector for the set of byte multiplexors based on the wrap shift amount and the shift amount, wherein a first nibble of the byte select vector corresponds to a first one of the set of byte multiplexors and a second nibble of the byte select vector corresponds to a second one of the set of byte multiplexors.

2. The method of claim 1 further comprises selecting, by the set of byte multiplexors, the data operand from the first set of byte locations and shift data from the second set of byte locations based on the byte select vector.

3. The method of claim 1, wherein step (a) further comprises determining number of bytes in the first and second set of byte locations based on the mode of shifting.

4. The method of claim 3, wherein the mode of shifting comprises a rotate, logical shift, and an arithmetic shift for an N bit data element, wherein the shift data includes the data operand for the rotate shift, wherein the shift data includes zeros for the logical shift, and wherein the shift data includes a sign bit of the data operand for the arithmetic shift.

5. The method of claim 1 further comprises, in parallel with steps (a) through (e),
- storing second data operand in a third set of byte locations and second shift data in a fourth set of byte locations;
- obtaining a second shift amount for the second data;
- determining, for each byte multiplexor of a second set of byte multiplexors associated with a second corresponding output byte, whether a second wrap condition will occur based on the second shift amount for the second data;
- when the second wrap condition will occur for at least one of the second set of byte multiplexors, determining a second wrap shift amount based on the mode of shifting; and
- generating a second byte select vector for the second set of byte multiplexors based on the wrap shift amount and the shift amount, wherein a first nibble of the second byte select vector corresponds to a first one of the second set of byte multiplexors and a second nibble of the second byte select vector corresponds to a second one of the second one of the set of byte multiplexors.

6. An apparatus for cross-bar shifting, the apparatus comprises:
- a first plurality of byte locations;
- a second plurality of byte locations;
- a plurality of byte multiplexors, wherein each set of the plurality of byte multiplexors is associated with a corresponding output byte, and wherein each of the plurality of byte multiplexors is operably coupled to the first and second plurality of byte locations;
- a byte selection module operably coupled to the plurality of multiplexors, wherein the byte selection module generates, for each set of the plurality of multiplexors, a byte select vector based on a byte shift amount and a mode of shifting, wherein the plurality of multiplexors output shifted data in accordance with the byte select vectors;
- wherein the first and second plurality of byte locations are each divided into a plurality of sets of bytes, wherein each set of bytes stores an individual data word, and wherein each set of bytes of the first plurality of byte locations has a corresponding set of bytes in the second plurality of byte locations.

7. An apparatus for cross-bar shifting, the apparatus comprises:
- a first set of bytes, wherein the first set of bytes is divided into at least one grouping of bytes, wherein each grouping of bytes of the first set of bytes stores a unique data element;
- a second set of bytes that is divided into the same number of grouping of bytes as the first set of bytes, wherein each of the grouping of bytes of the second set of bytes is associated with a corresponding one of the grouping of bytes of the first set of bytes and stores shift data corresponding to the unique data;
- a plurality of multiplexors operably coupled to the first and second set of bytes;
- a plurality of byte select modules, wherein each of the byte select modules is associated with a corresponding one of the plurality of multiplexors, wherein each byte select module generates a byte selection value based on a byte shift amount, a mode of shifting, and location of the corresponding multiplexor with respect to a plurality of output bytes; and
- wherein the first and second set of bytes are each comprise four groupings of two bytes per grouping, wherein a unique set of the plurality of multiplexors is associated with a corresponding one of the four grouping of bytes, and a unique set of the byte select modules is associated with a corresponding set of the plurality of multiplexors.

8. The apparatus of claim 7, wherein each set of byte select modules determines that a wrap condition does not occur when the byte shift amount is less than a whole byte and determines that a wrap condition occurs when the byte shift amount is equal to or greater than a whole byte, wherein the set of byte select modules generates a byte shift value of zero when the wrap condition does not occur and generates a byte shift value of six when the wrap condition does occur.

9. An apparatus for cross-bar shifting, the apparatus comprises:
- a first plurality of byte locations;
- a second plurality of byte locations;
- a plurality of byte multiplexors, wherein each set of the plurality of byte multiplexors is associated with a corresponding output byte, and wherein each of the plurality of byte multiplexors is operably coupled to the first and second plurality of byte locations;
- a byte selection module operably coupled to the plurality of multiplexors, wherein the byte selection module generates, for each set of the plurality of multiplexors, a byte select vector based on a byte shift amount and a mode of shifting, wherein the plurality of multiplexors output shifted data in accordance with the byte select vectors;
- wherein the byte selection module comprises a byte select module for each set of the multiplexors, wherein each byte select module includes a first nibble module coupled to a first one of the set of multiplexors and a second nibble module coupled to a second one of the set of multiplexors; and
- wherein the first and second nibble modules each further comprises a wrap shift module operably coupled to receive the byte shift amount and the mode of shifting, wherein the wrap shift module determines whether a wrap condition exists based on the byte shift amount and the mode of shifting and wherein the wrap shift module generates a wrap shift amount when the wrap condition exists, and an output module operably coupled to the wrap shift module, wherein the output module produces a nibble of the byte select vector based on the wrap shift amount, the mode of shifting, and location of the corresponding one of the set of multiplexors.

10. The apparatus of claim 9, wherein the first and second nibble modules each further comprises:
- an inversion module operable to invert the nibble of the byte select vector when a left shift indication is detected.

11. An apparatus for cross-bar shifting, the apparatus comprises:
- a first set of bytes, wherein the first set of bytes is divided into at least one grouping of bytes, wherein each grouping of bytes of the first set of bytes stores a unique data element;
- a second set of bytes that is divided into the same number of grouping of bytes as the first set of bytes, wherein each of the grouping of bytes of the second set of bytes is associated with a corresponding one of the grouping of bytes of the first set of bytes and stores shift data corresponding to the unique data;

a plurality of multiplexors operably coupled to the first and second set of bytes;

a plurality of byte select modules, wherein each of the byte select modules is associated with a corresponding one of the plurality of multiplexors, wherein each byte select module generates a byte selection value based on a byte shift amount, a mode of shifting, and location of the corresponding multiplexor with respect to a plurality of output bytes; and wherein the first and second set of bytes are each comprise two groupings of four bytes per grouping, wherein a unique quartet of the plurality of multiplexors is associated with a corresponding one of the two grouping of bytes, and a unique quartet of the byte select modules is associated with a corresponding quartet of the plurality of multiplexors.

12. The apparatus of claim 11, wherein each quartet of byte select modules determines that a wrap condition does not occur when the byte shift amount is less than three bytes and determines that a wrap condition occurs when the byte shift amount is equal to or greater than three byte, wherein the quartet of byte select modules generates a byte shift value of zero when the wrap condition does not occur and generates a byte shift value of four when the wrap condition does occur.

13. An apparatus for cross-bar shifting, the apparatus comprises:

a first set of bytes, wherein the first set of bytes is divided into at least one grouping of bytes, wherein each grouping of bytes of the first set of bytes stores a unique data element;

a second set of bytes that is divided into the same number of grouping of bytes as the first set of bytes, wherein each of the grouping of bytes of the second set of bytes is associated with a corresponding one of the grouping of bytes of the first set of bytes and stores shift data corresponding to the unique data;

a plurality of multiplexors operably coupled to the first and second set of bytes;

a plurality of byte select modules, wherein each of the byte select modules is associated with a corresponding one of the plurality of multiplexors, wherein each byte select module generates a byte selection value based on a byte shift amount, a mode of shifting, and location of the corresponding multiplexor with respect to a plurality of output bytes; and wherein the first and second set of bytes are each comprise eight groupings of one byte per grouping, wherein a unique one of the plurality of multiplexors is associated with a corresponding one of the eight grouping of bytes, and a unique one of the byte select modules is associated with a corresponding one of multiplexors.

14. The apparatus of claim 13, wherein each one of byte select modules determines that a wrap condition does not occur when the byte shift amount is zero and determines that a wrap condition occurs when the byte shift amount is greater than zero, wherein the one of byte select modules generates a byte shift value of zero when the wrap condition does not occur and generates a byte shift value of seven when the wrap condition does occur.

* * * * *